(12) United States Patent
Shen

(10) Patent No.: US 9,903,759 B2
(45) Date of Patent: Feb. 27, 2018

(54) ETALONS AND METHODS AND SYSTEMS FOR FABRICATING SAME

(71) Applicant: Dar-Tson Shen, West Vancouver (CA)

(72) Inventor: Dar-Tson Shen, West Vancouver (CA)

(*) Notice: Subject to any disclaimer, the term of this patent is extended or adjusted under 35 U.S.C. 154(b) by 266 days.

(21) Appl. No.: 14/660,091

(22) Filed: Mar. 17, 2015

(65) Prior Publication Data

US 2016/0273964 A1    Sep. 22, 2016

(51) Int. Cl.

| | | |
|---|---|---|
| *G02B 26/00* | (2006.01) | |
| *G02B 26/08* | (2006.01) | |
| *G02F 1/03* | (2006.01) | |
| *G02F 1/29* | (2006.01) | |
| *G02B 27/00* | (2006.01) | |
| *G01J 3/26* | (2006.01) | |
| *C03C 27/06* | (2006.01) | |

(52) U.S. Cl.
CPC .............. *G01J 3/26* (2013.01); *C03C 27/06* (2013.01); *G02B 26/001* (2013.01)

(58) Field of Classification Search
CPC   G02B 26/0841; G02B 26/001; G02B 6/2766; G02B 27/283; G02B 6/29358; G02B 26/105; B82Y 20/00; G02F 1/015; G02F 1/315; G02F 1/31; G02F 1/29; G02F 1/0333; B23K 26/067
USPC ........ 359/290, 245, 260–261, 298, 301–303, 359/317–318, 577, 292–292, 223–225, 359/262–263, 295, 198
See application file for complete search history.

(56) References Cited

U.S. PATENT DOCUMENTS

2002/0031155 A1*  3/2002  Tayebati ................... G01J 3/26
                                                                 372/50.1
2005/0078906 A1*  4/2005  Lunt ..................... G02B 26/001
                                                                  385/15

* cited by examiner

*Primary Examiner* — Dawayne A Pinkney
(74) *Attorney, Agent, or Firm* — Todd A. Rattray; Oyen Wiggs; Green & Mutala LLP

(57) ABSTRACT

A method for manufacturing an etalon is disclosed. The method comprises arranging a plurality of first spacers between a flat surface of a first optical plate and a concave surface of a second optical plate. For each of the spacers, the flat surface bears on a first abutment surface of the spacer and the concave surface bears on a second abutment surface of the spacer. The concave surface is deformed to be parallel to the second abutment surfaces. For each of the spacers, the flat surface is bonded to the first abutment surface and the concave surface is bonded to the second abutment surface.

28 Claims, 9 Drawing Sheets

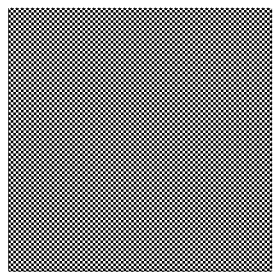 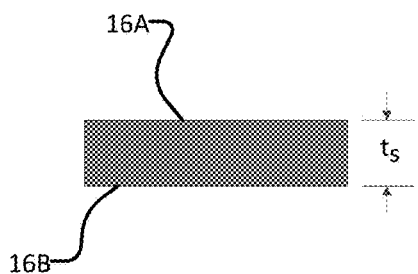
FIGURE 4A  FIGURE 4B
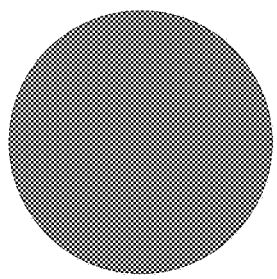 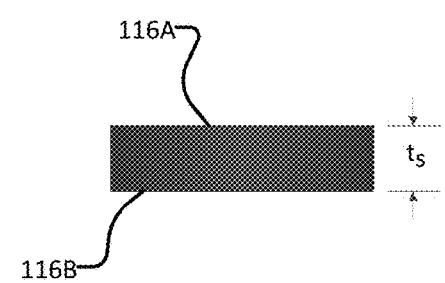
FIGURE 4C  FIGURE 4D

ETALONS AND METHODS AND SYSTEMS FOR FABRICATING SAME

TECHNICAL FIELD

The invention relates to etalons and their manufacture. Particular non-limiting embodiments provide etalons and methods of manufacturing the same.

BACKGROUND

Etalons, also known as Fabry-Pérot interferometers, are commonly used in telecommunications, lasers, spectroscopy and astronomy. By way of non-limiting example, etalons may be used to control and/or measure the wavelengths of light. In particular, an etalon may be used to filter all but only a very narrow bandwidth of light.

Commonly, etalons comprise a pair of parallel optical plates spaced apart by a fixed distance. The spacing distance is typically on the order of 1 mm or several millimeters. The opposing surfaces of the optical plates that face each other are commonly reflective or partially reflective. The facing surfaces may have reflective or partially reflective coatings applied thereto. Often, the optical plates are wedge shaped (i.e. their proximate surfaces are parallel to one another, but their distal (or rear) surfaces are provided at an incline relative to the proximate surfaces) to prevent or minimize the distal surfaces from producing interference fringes. The distal surfaces may have anti-reflective coatings.

Illumination for an etalon is typically provided by a diffuse light source located at the focal plane of a collimating lens. As a light ray passes through the paired optical plates, the light ray is multiply reflected between the paired optical plates to produce multiple transmitted light rays. The multiple transmitted light rays may be collected by a focusing lens and directed onto a screen to produce an interference pattern. The interference pattern may take the appearance of a set of concentric rings due to constructive and destructive interference of the light rays.

The sharpness of the rings and/or resolving power of an etalon may be affected by the quality (e.g. reflectivity, smoothness and/or flatness) of the reflecting surfaces. A high reflectivity surface (e.g. a surface with relatively high reflectivity) tends to produce a set of narrow bright rings against a dark background while a low reflectivity surface (e.g. a surface with relatively low reflectivity) tends to produce wider bright rings. An etalon with relatively high reflectivity surfaces which produce narrow interference rings is said to have high finesse while an etalon with relatively low reflectivity surfaces which produce wider interference rings is said to have low finesse. High finesse is a generally desirable quality of an etalon because high finesse increases the ability to resolve different rings from one another and the corresponding resolving power of the etalon. In a perfect etalon (with perfectly parallel and perfectly flat reflective surfaces), the finesse of an etalon depends on the reflectivity of the reflective surfaces, with higher reflectivity surfaces resulting in higher finesse. In real etalons, however, imperfections in surface flatness and parallelism tend to reduce contrast between rings and, consequently, lower the resolving power of the etalon due to multiple reflections in the etalon.

Traditionally, to achieve high finesse, the opposing surfaces of the optical flats each are polished to achieve an extremely high degree of surface flatness or a correspondingly low surface figure. For example, opposing surfaces of the optical flats used in typical etalons are often polished to have surface figures of less than approximately $\lambda/20$, where $\lambda$ corresponds to the light source with which the etalon is to be illuminated). In a typical scenario, where the light source used to illuminate the etalon is a HeNe laser having a wavelength of 633 nm, this surface figure corresponds to maximum irregularities on the order of approximately 32 nm. Manufacturing glass plates, such as optical flats, having such a low surface figure can be very time consuming and expensive and may be especially difficult for thin optical plates, as used in traditional etalons.

Prior art etalons are typically made of an optical material such as quartz crystal because quartz exhibits a relatively low coefficient of thermal expansion. Quartz can be very expensive to use in such applications and increases the costs of manufacturing traditional etalons. Less expensive materials such as borosilicate glass (also known as Pyrex™) exhibit a relatively high coefficient of thermal expansion and are not suitable for traditional methods of making etalons. Because of the desirability of flatness of the proximate surfaces (e.g. surface figure on the order of $\lambda/20$ or less, as discussed above), the optical plates used to make etalons using traditional techniques are often relatively thick (e.g. over 5 mm) to achieve sufficient surface figure while avoiding bending or deformation. Plates with such thicknesses involve correspondingly high material costs relative to plates made with relatively low thicknesses. In general, fabricating surfaces with low surface figure may be difficult and expensive.

There is a general desire for improved and inexpensive methods to manufacture etalons.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with apparatus and methods which are meant to be exemplary and illustrative but not limiting in scope. In various embodiments, one or more of the above-described problems have been reduced or eliminated, while other embodiments are directed to other improvements.

The invention has a number of aspects. One aspect of the invention provides a method for manufacturing an optical device (e.g. an etalon). The method comprises: optical contact bonding a plurality of spacers to a flat surface of a first optical plate; optical contact bonding a second surface of a second optical plate to the plurality of spacers. Optical contact bonding the second surface of the second plate to the plurality of spacers may comprise deforming the second surface from a concave shape to a generally flat shape. The generally flat shape of the second surface may contact the plurality of spacers to facilitate optical contact bonding. The first plate may have a thickness that is greater than a thickness of the second plate. Deforming the second surface from the concave shape to the generally flat shape may comprise forcing the second optical plate toward the first optical plate. Deforming the second surface from the concave shape to the generally flat shape may comprise applying a force to the second optical plate, the force directed toward the first optical plate. Deforming the second surface from the concave shape to the generally flat shape may comprise applying a force to the second optical plate, the force directed toward at least some the plurality of spacers.

The generally flat shape of the second surface may be parallel to the flat surface of the first optical plate.

Another aspect of the invention provides a method for manufacturing an optical device (e.g. an etalon). The method comprises: arranging a plurality of spacers between a flat surface of a first optical plate and a concave surface of a second optical plate; bonding the flat surface of the first optical plate to each of the plurality of spacers; deforming the concave surface to provide a deformed surface; and bonding the deformed surface of the second optical plate to each of the plurality of spacers. Bonding the flat surface of the first optical plate to the spacers and bonding the deformed surface of the second optical plate to the spacers may comprise optical contact bonding. The deformed surface may contact the plurality of spacers to facilitate optical contact bonding. The first plate may have a thickness that is greater than a thickness of the second plate. Deforming the concave surface to provide the deformed surface may comprise forcing the second optical plate toward the first optical plate. Deforming the concave surface to provide the deformed surface may comprise applying a force to the second optical plate, the force directed toward the first optical plate. Deforming the concave surface to provide the deformed surface may comprise applying a force to the second optical plate, the force directed toward at least some the plurality of spacers. The deformed surface may be parallel to the flat surface of the first optical plate.

The deformation process may take advantage of the elasticity of the material from which the first and second optical plates are made (e.g. optical glass of various types).

Another aspect of the invention provides an etalon comprising: a first optical plate having a first flat surface; a second optical plate having a second flat surface spaced apart from the first flat surface and facing the first flat surface; and a plurality of spacers located between the first and second flat surfaces, each of the plurality of spacers comprising a first abutment surface bonded to the first flat surface and a second abutment surface bonded to the second flat surface. The second flat surface comprises a deformed surface having had a concave shape prior to deformation. The second flat surface may be elastically deformed. The bonds between first flat surface and the first abutment surfaces and between the second flat surface and the second abutment surfaces may comprise optical contact bonds.

Further aspects of the invention and non-limiting example embodiments of the invention are illustrated in the accompanying drawings and/or described in the following description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A and 4B are plan and cross-sections, respectively, of a spacer which may be used in the FIG. 1 etalon assembly according to a particular embodiment.

FIGS. 4C and 4D are plan and cross-sections, respectively, of a spacer which may be used in the FIG. 1 etalon assembly according to another particular embodiment.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide etalon assemblies. In some embodiments, an etalon assembly comprises a plurality of separate components which are assembled relative to one another but which are not yet bonded or otherwise attached to one another. An etalon assembly may be assembled as part of a method of manufacturing an etalon. Aspects of the invention provide methods for manufacturing an etalon which comprise assembling an etalon assembly and then bringing its components into contact with one another to bond (e.g. optical contact bond) its components to one another to thereby create a monolithic (i.e. one piece) etalon. Aspects of the invention provide etalons manufactured by such methods.

Figure 1:
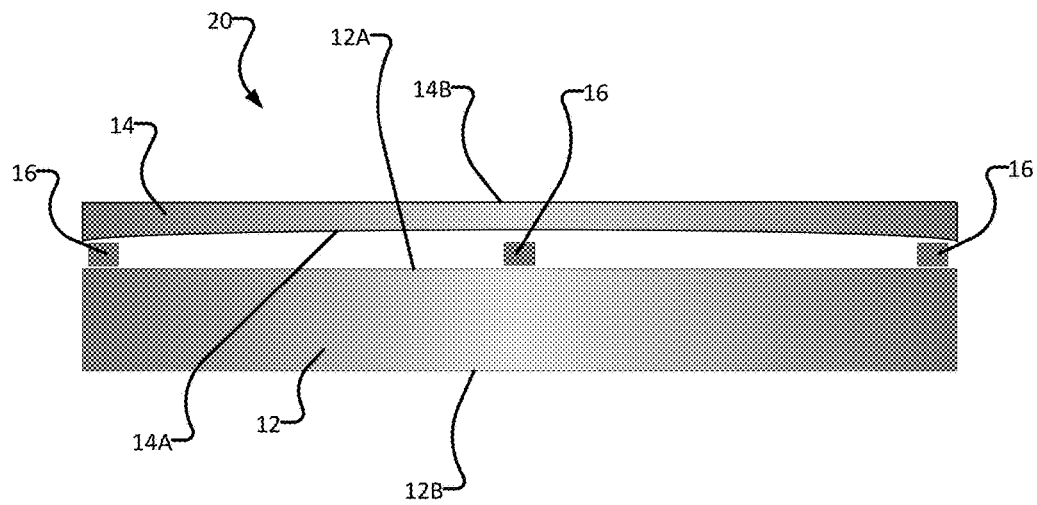
FIG. 1 is a cross-section of an etalon assembly according to a particular example embodiment.

FIG. 1 depicts an etalon assembly 20 according to a particular embodiment. Etalon assembly 20 of the FIG. 1 embodiment comprises first and second optical plates 12, 14. First optical plate 12 is spaced apart from second optical plate 14 by a plurality of spacers 16. First optical plate 12 comprises a proximate surface 12A that generally faces second optical plate 14 and a distal surface 12B that generally faces away from second optical plate 14. Second optical plate 14 comprises a proximate surface 14A that generally faces first optical plate 12 and a distal surface 14B that generally faces away from first optical plate 12. First optical plate 12, second optical plate 14 and the plurality of spacers 16 may be bonded together (e.g. optical contact bonded) to form a monolithic (i.e. one piece) etalon 10, as described in more detail below.

Figure 2A:
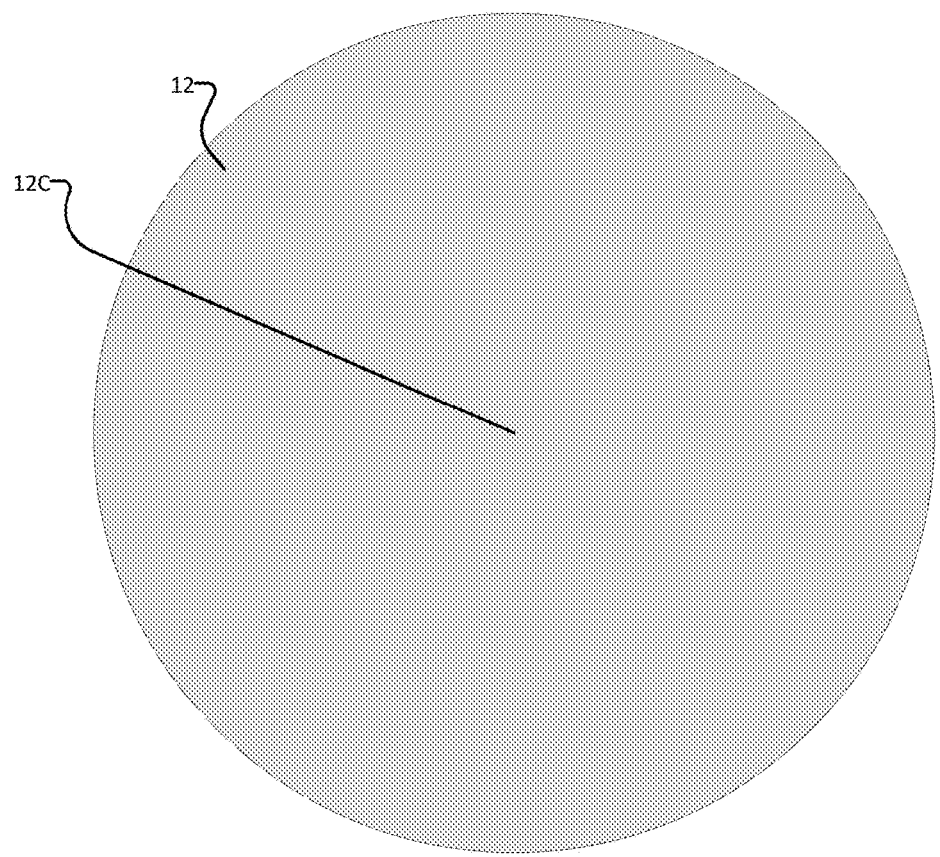
FIGS. 2A and 2B are plan and cross-sections, respectively, of a first optical plate according to the FIG. 1 embodiment assembly according to a particular embodiment.
Figure 2B:
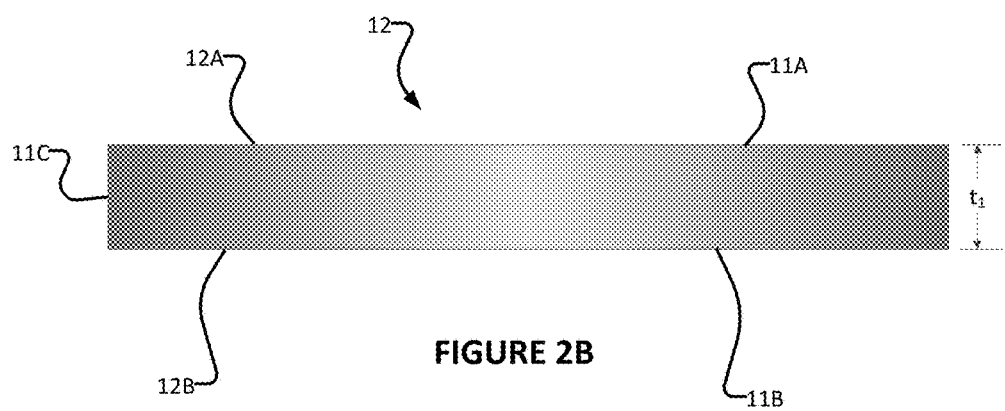

As shown in FIGS. 2A and 2B, first optical plate 12 comprises first and second sides 11A, 11B and a perimeter edge 11C. First side 11A comprises a proximate flat surface 12A having a center 12C. Center 12C of optical plate may be located on an axis of symmetry (not expressly enumerated) of etalon assembly 20 which may extend into and out of the page in the illustrated view of FIG. 2A. Proximate flat surface 12A may occupy the entirety of first side 11A or may occupy only a portion of first side 11A (for example, if first side 11A includes a raised ridge around its perimeter, only the flat portion and not the raised ridge of first side 11A is part of proximate flat surface 12A). Second side 11B comprises a distal flat surface 12B Like proximate flat surface 12A, distal flat surface 12B may occupy the entirety of second side 11B or may occupy only a portion of second side 11B. Perimeter edge 11C may be flat, angled, beveled or rounded. Although not-shown in the illustrated embodiment, in some embodiments, distal flat surface 12B may be or may comprise a wedge-shaped surface 12B that, although flat, is not strictly parallel with proximate flat surface 12A. Such a wedge-shaped distal flat surface 12B may mitigate against interference caused by having parallel flat surfaces 12A, 12B. Such a wedge-shaped surface 12B is not necessary and in some embodiments, proximate and distal surfaces 12A, 12B of first optical plate 12 may be parallel or may have some other relative shapes.

Proximate flat surface 12A may be made relatively flat by grinding, polishing, molding and/or the like. In some embodiments, the surface figure of proximate surface 12A is in a range between $\lambda/40$ to $\lambda/10$, where $\lambda$ represents a wavelength of evaluation (e.g. in an interferometer) to measure the surface figure of surface 12A. In a typical (but non-limiting) scenario, where the light source used to evaluate surface 12A is a HeNe laser having a wavelength of 633 nm, this surface figure corresponds to maximum irregularities on the order of approximately 16 nm to 63 nm. In some embodiments, this surface figure of proximate surface 12A is in a range between $\lambda/20$ to $\lambda/12$. In particular embodiments, methods according to particular aspects of the invention and etalons fabricated according to such methods may permit relatively relaxed tolerances on the flatness of proximate surface 12A. In some embodiments, this surface figure of proximate surface 12A may be permitted to be greater than or equal to $\lambda/20$. In some embodiments, this surface figure of proximate surface 12A may be permitted to be greater than $\lambda/15$. In some embodiments, this surface figure of proximate surface 12A may be permitted to be greater than $\lambda/12$.

The perimeter shape of proximate flat surface 12A is depicted in FIG. 2A as being circular. In other embodiments, proximate flat surface 12A may have any suitable perimeter shape which may be desirable. By way of non-limiting example, the perimeter shape of proximate flat surface 12A can be any of, rectangular, polygonal, circular, elliptical and/or the like and/or any irregular perimeter shape. As long as the surface area of proximate flat surface 12A is large enough to allow a desired amount of light to pass through optical plate 12 without being affected by the perimeter shape, the shape near the edges of proximate flat surface 12A is unimportant. In addition to flat surfaces 12A, 12B, corresponding sides 11A, 11B of first optical plate 12 may comprise other portions, which may be located outside of flat surfaces 12A, 12B (e.g. for manufacturing and/or mounting purposes and/or the like).

The thickness, $t_1$, of first optical plate 12 may vary depending on the application of etalon 10. In some embodiments, optical plate 12 has a thickness of between approximately four millimeters and 12 millimeters. In particular embodiments, optical plate 12 has a thickness of seven millimeters. The term thickness, as used herein to describe a dimension of first optical plate 12, refers to the maximum distance between proximate flat surface 12A and distal flat surface 12B. In some embodiments, where proximate flat surface 12A does not occupy the entirety of first side 11A, the non-flat portions of first side 11A should be ignored for the purposes of determining the thickness, $t_1$, of first optical plate 12. In general, the thickness, $t_1$, of first optical plate 12 may comprise any suitable thickness desired for a particular application. In general, this thickness, $t_1$, of first optical plate 12 may increase with the cross-sectional area of proximate flat surface 12A.

Figure 3A:
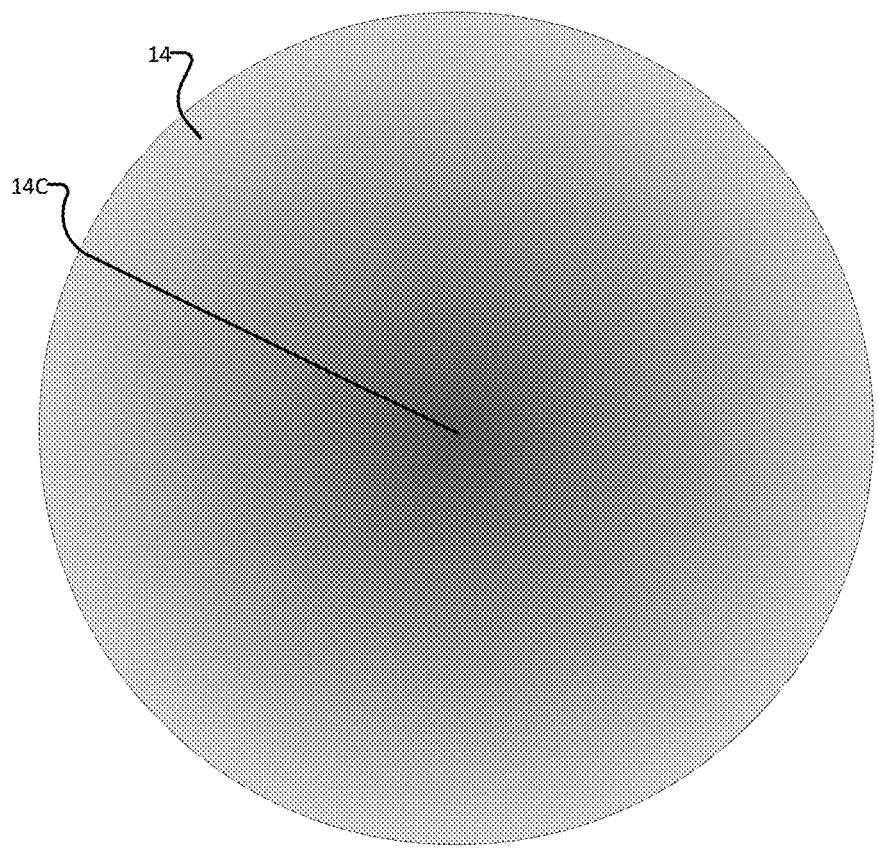
FIGS. 3A and 3B are plan and cross-sections, respectively, of a second optical plate according to the FIG. 1 embodiment assembly according to a particular embodiment.
Figure 3B:
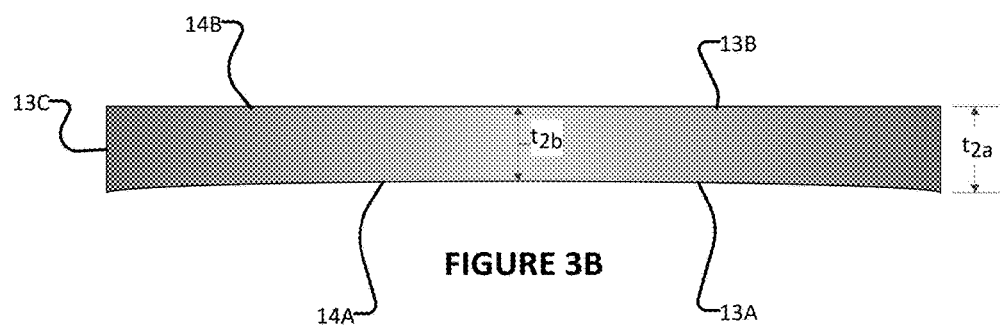

As shown in FIGS. 3A and 3B, second optical plate 14 comprises first and second sides 13A, 13B and a perimeter edge 13C. First side 13A comprises a proximate concave surface 14A. Proximate concave surface 14A may occupy the entirety of first side 13A or may occupy only a portion of first side 13A (for example, if first side 13A includes a flat portion around its perimeter, only the concave portion and not the flat portion of first side 13A is part of proximate concave surface 14A). Second side 13B comprises a distal flat surface 14B. Like proximate concave surface 14A, distal flat surface 14B may occupy the entirety of second side 13B or may occupy only a portion of second side 13B. Perimeter edge 13C may be flat, angled, beveled or rounded. Although not-shown in the illustrated embodiment, in some embodiments, distal flat surface 14B may be or may comprise a wedge-shaped surface 14B that, although flat, is not strictly parallel with proximate flat surface 12A of first optical plate 12 (e.g. after fabrication of etalon 10). Such a wedge-shaped distal flat surface 14B may mitigate against interference. Such a wedge-shaped distal surface 14B is not necessary and distal flat surface 14B of second optical plate 14 may be parallel to or have some other shape relative to proximate surface 12A of first optical plate 12 (after fabrication of etalon 10).

The term thickness, as used herein to describe a dimension of second optical plate 14, refers to the maximum thickness, $t_{2a}$, between proximate concave surface 14A and distal flat surface 14B. In some embodiments, where proximate concave surface 14A does not occupy the entirety of first side 13A, the non-concave surfaces should be ignored for the purposes of determining the thickness of second optical plate 14.

The thickness, $t_{2a}$, of second optical plate 14 may vary depending on the application of etalon 10. In comparison to first optical plate 12, second optical plate 14 may be thinner (i.e. $t_{2a} < t_1$) to allow for deformation (e.g. elastic deformation) of second optical plate 14 without cracking, as described below. In some embodiments, the thickness of second optical plate 14 may be less than or equal to 75% of the thickness of first optical plate 12 (i.e. $t_{2a} <= \frac{3}{4} t_1$). In some embodiments, this thickness ratio is less than or equal to 50% (i.e. $t_{2a} <= \frac{1}{2} t_1$). In some embodiments, this thickness ratio is less than or equal to 25% (i.e. $t_{2a} <= \frac{1}{4} t_1$). In some embodiments, optical plate 14 has a thickness, $t_{2a}$, of between approximately two millimeters and 12 millimeters. In particular embodiments, optical plate 14 has a thickness, $t_{2a}$, of four millimeters. The thickness of second optical plate 14 is not limited to these thicknesses and could be generally be provided with any thickness that permits the functionality described herein.

In some embodiments, proximate concave surface 14A is spherically concave, while in other embodiments proximate concave surface 14A may be parabolic and/or other forms of smooth or continuous concavity. The amount of concavity of proximate concave surface 14A is referred to herein as the depth of concavity and is measured by obtaining the difference between the minimum thickness, $t_{2b}$, of second optical plate 14 and the maximum thickness, $t_{2a}$, of second optical plate 14 (i.e. depth of concavity=$t_{2a} - t_{2b}$). In some embodiments, the depth of concavity of proximate concave surface 14A is between $\lambda/8$ and $\lambda/2$, where $\lambda$ refers to the wavelength (e.g. of the interferometer) used to evaluate surface 14A. This concavity depth may correspond to 75 nm-335 nm in some embodiments. In particular embodiments, the depth of concavity of surface 14A is λ/4. In some embodiments, the depth of concavity of proximate concave surface 14A is between 50 nm-350 nm. In particular embodiments, the depth of concavity is between 100 nm-200 nm.

The perimeter shape of proximate concave surface 14A is depicted in FIG. 3A as being circular. In other embodiments, proximate concave surface 14A may have any suitable perimeter shape. By way of non-limiting example, the perimeter shape of proximate concave surface 14A can be any of, rectangular, polygonal, circular, elliptical and/or the like and/or any irregular perimeter shape. As long as the surface area of proximate concave surface 14A is large enough to allow a desired amount of light to pass through optical plate 14 without being affected by the perimeter shape, the shape near the edges of proximate flat surface 14A is unimportant. In addition to surfaces 14A, 14B, corresponding sides 13A, 13B of second optical plate 14 may comprise other portions, which may be located outside of surfaces 14A, 14B (e.g. for manufacturing and/or mounting purposes and/or the like).

Because of the fabrication techniques described herein, proximate surface 14A may be provided with relatively low flatness or be permitted to have relatively high surface figure (as compared, for example, to proximate surface 12A of first optical plate 12). In some embodiments, proximate surfaces 14A may be ground and/or polished and/or the like to have a surface figure in a range between λ/10 to λ/2, where λ represents a wavelength of evaluation (e.g. in an interferometer) to measure the surface figure of surface 14A. In some embodiments, this surface figure is in a range between λ/8 to λ/3. In a typical (but non-limiting) scenario, where the light source used to evaluate surface 12A is a HeNe laser having a wavelength of 633 nm, this surface figure corresponds to maximum irregularities on the order of approximately 63 nm to 317 nm. In some embodiments, the maximum size of surface irregularities is between 79 nm to 211 nm.

As best depicted in FIG. 1, proximate flat surface 12A and proximate concave surface 14A may be provided with the same or similar perimeter shapes and accordingly may have the same or similar surface areas, although the size of etalon 10 can vary depending on the application. For example, in some embodiments where proximate flat surface 12A and proximate concave surface 14A are circular, they may each have diameters of between approximately 20 mm and 200 mm, although other diameters are possible. Flat surface 12A and concave surface 14A are not limited to these diameters or to these cross-sectional shapes or areas. In general, flat surface 12A and concave surface 14A may have any suitable sizes or shapes which provide the functionality described herein.

As depicted in FIG. 1, etalon assembly 20 comprises a plurality of spacers 16. FIGS. 4A and 4B depict an exemplary spacer 16 according to a particular embodiment. Spacer 16 comprises first abutment surface 16A and second abutment surface 16B. First abutment surface 16A is parallel with second abutment surface 16B. Both of first abutment surface 16A and second abutment surface 16B may be flat, similar to proximate flat surface 12A, to allow optical contact with proximate flat surface 12A and proper deformation of proximate concave surface 14A, as described below. First abutment surface 16A and second abutment surface 16B may be made smooth (e.g. relatively free from bumps or indentations) by grinding, polishing, molding or otherwise. In some embodiments, the surface figure of abutment surfaces 16A, 16B of spacers 16 is in a range between λ/40 to λ/10, where λ has the meaning discussed above. In some embodiments, this surface figure of abutment surfaces 16A, 16B is in a range between λ/20 to λ/12. In a typical (but non-limiting) scenario, where the light source used to evaluate surface 12A is a HeNe laser having a wavelength of 633 nm, this surface figure corresponds to maximum irregularities on the order of approximately 16 nm to 63 nm. In particular embodiments, the maximum size of surface irregularities is less than or equal to λ/20. In some embodiments, the maximum size of surface irregularities is between 10 nm to 70 nm. In particular embodiments, the maximum size of surface irregularities is between 20 nm to 35 nm.

In the illustrated embodiments, spacers 16 all have substantially the same size and perimeter shape, although this is not necessary. In some embodiments, some spacers 16 may have different sizes or perimeter shapes than other spacers 16. However, it is beneficial that all spacers 16 have the same thickness, as described below.

In FIGS. 4A and 4B, spacers 16 are depicted as having square perimeter shapes; however, this is merely done for convenience. In practice, spacers 16 can comprise any suitable perimeter shape, such as rectangular, polygonal, circular, elliptical and/or the like and/or any irregular perimeter shape. FIGS. 4C and 4D depict spacers 116 which have circular perimeter shapes. Spacers 116 are otherwise identical to spacers 16 and can be used in addition to or in the alternative to spacers 16. Features of spacers 16 described herein should be understood to apply to spacers 116.

As can be seen in FIGS. 4A-4C, spacers 16 (and spacers 116) have a small surface area in relation to proximate flat surface 12A and proximate concave surface 14A. In particular, in some embodiments, the surface area of each spacer 16 is between approximately 1% and 8% of the surface area of proximate flat surface 12A, although other surface areas are possible.

As shown in FIG. 4B, spacers 16 have a thickness, $t_s$. As illustrated in FIG. 1, the thickness of spacers, $t_s$, 16 may be relatively thin in comparison to the thickness of first optical plate 12 and second optical plate 14. In particular, spacers 16 may have a thickness, $t_s$, between 0.05 mm and 0.2 mm. In some cases, spacers 16 have a thickness, $t_s$, of 0.1 mm. The thickness, $t_s$, of spacers 16 may be between 2% and 10% of thickness, $t_2$, of first optical plate 12. In general, the thickness of spacers 16 is not limited to any of the thickness described herein and may be set to any suitable level. Typically, the thickness, $t_s$, of spacers 16 may be set to control the order of the fringes. So, for etalons with different applications, the thickness, $t_s$, of spacers 16 may be set accordingly. All spacers 16 may have the same thickness, $t_s$. By having all spacers 16 of equal thickness, $t_s$, it is possible to use spacers 16 to deform proximate concave surface 14A into a flat surface, as described in more detail below. The thickness, $t_s$, of spacers 16 may be used to determine the space between concentric fringes when etalon 10 is used.

Figure 5A:
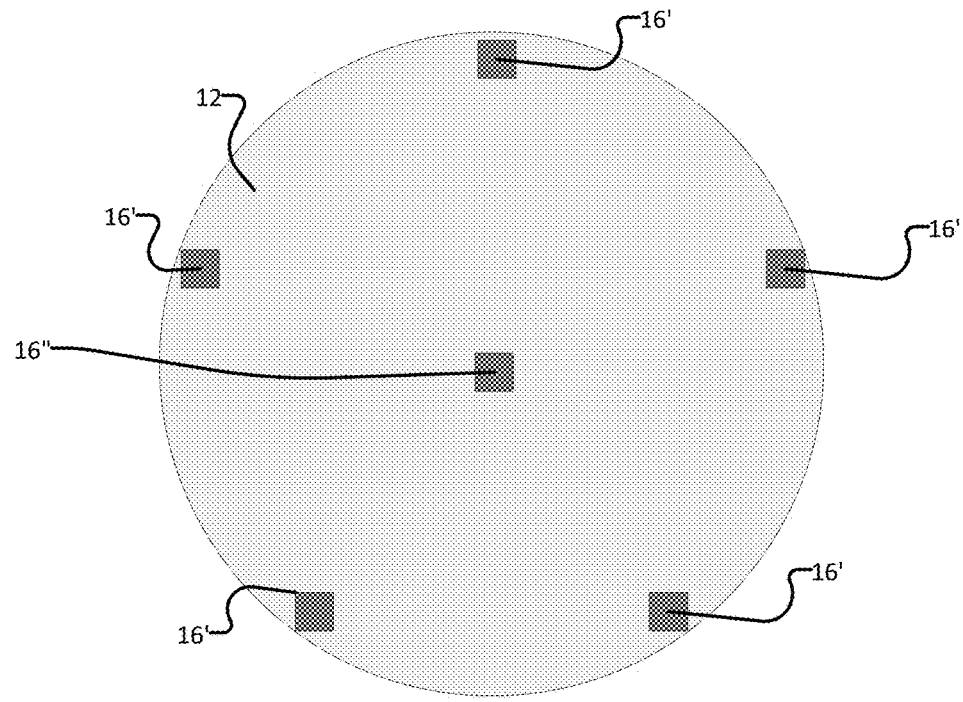
FIGS. 5A to 5D are plan views of layouts of spacers on a flat surface of a first optical plate which may be used in the FIG. 1 etalon assembly according to various embodiments.
Figure 5B:
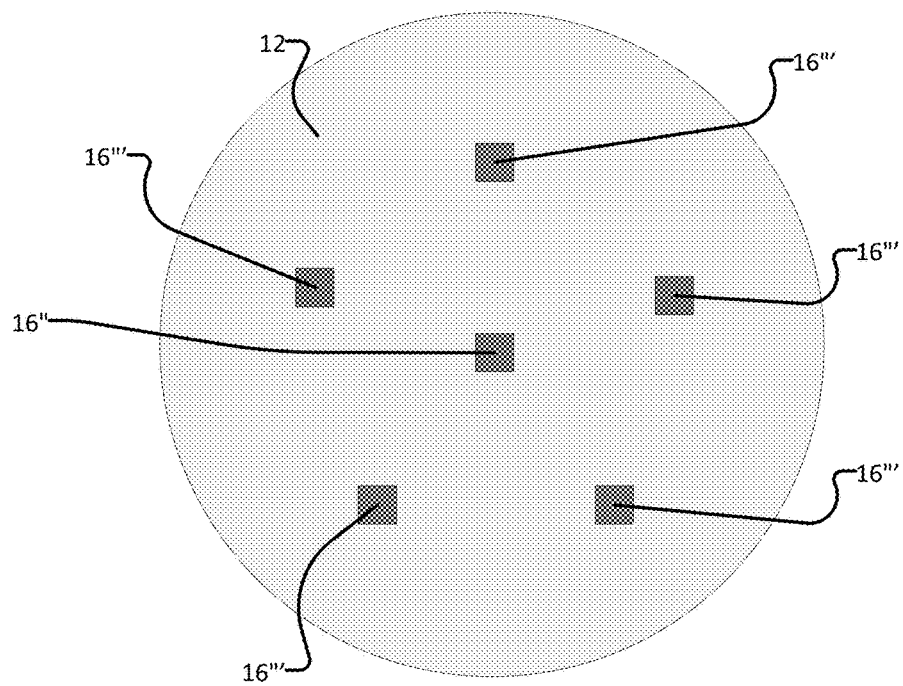
Figure 5C:
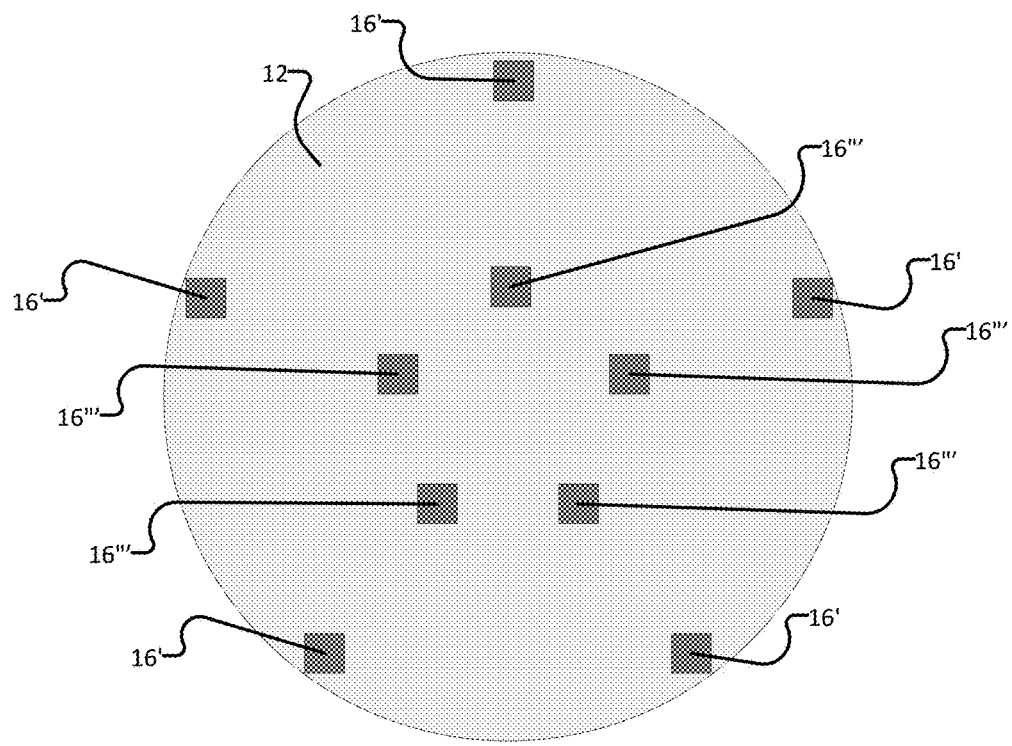
Figure 5D:
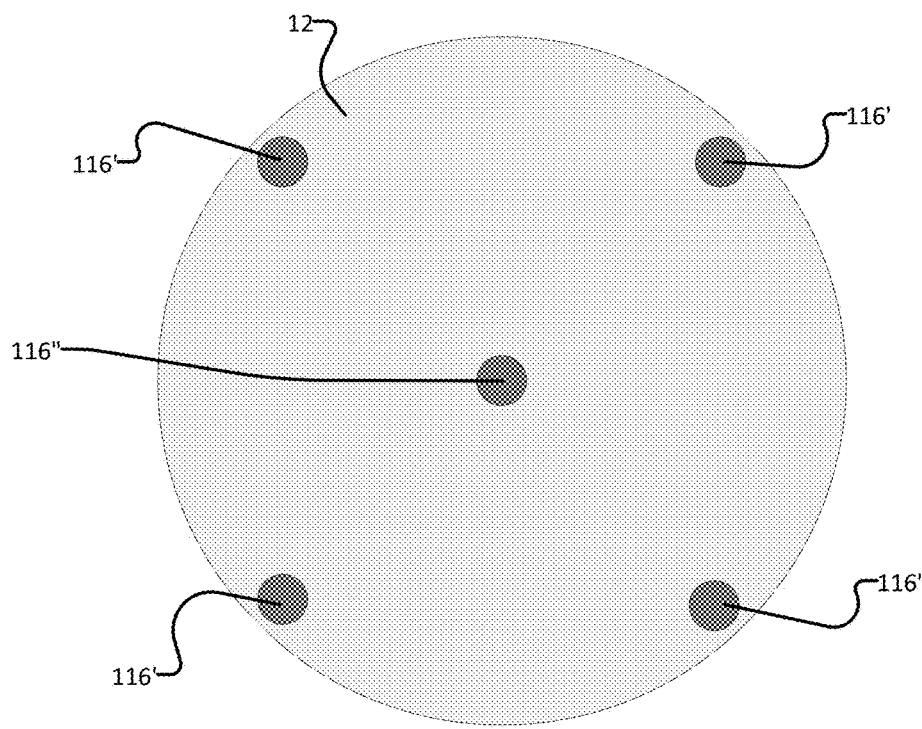

The number of spacers 16 can vary for different embodiments. In some cases, as the surface areas of flat surface 12 and concave surface 14 increase, it may be beneficial to increase the number of spacers 16. Some embodiments comprise three spacers 16 while in other embodiments, there are more than three. In particular, FIGS. 5A and 5B depicts an embodiment having six spacers 16, FIG. 5C depicts an embodiment having ten spacers 16 and FIG. 5D depicts an embodiment having five spacers 116. Alternatively or in addition to increasing the number of spacers 16, the surface area of each individual spacer 16 may increase as the surface areas of flat surface 12 and concave surface 14 increase to maintain a relatively constant ratio between the surface area of proximate flat surface 12A and the total surface area of all spacers 16.

Spacers 16 can be arranged in various patterns on proximate flat surface 12A. For example, some spacers 16 may be arranged around the perimeter of proximate flat surface 12A while other spacers 16 are located between center 12C of proximate flat surface 12A and the perimeter of proximate flat surface 12A. In some embodiments, one or more spacers 16 are located at center 12C of proximate flat surface 12A. In particular, some spacers 16 may be spaced apart at equal angular intervals so as to create circular symmetry in the arrangement of spacers 16 about center 12C.

Spacers 16, 116 may be referred to herein as outer spacers 16', 116' central spacers 16", 116" and intermediate spacers 16''', 116'''. In some embodiments, outer spacers 16', 116' central spacers 16", 116" and intermediate spacers 16''', 116''' are identical except for their location with respect to center 12C. In other embodiments, outer spacers 16', 116' central spacers 16", 116" and intermediate spacers 16''', 116''' may be different. Each of outer spacers 16', 116' central spacers 16", 116" and intermediate spacers 16''', 116''' may comprise any embodiment of spacer 16 or spacer 116 described herein. Outer spacers 16', 116' are typically located within approximately 17% of the diameter of flat proximate surface 12A from the perimeter of flat surface 12A. Central spacers 16", 116" are typically located within approximately 17% of the diameter of flat proximate surface 12A from center 12C of flat surface 12A. Intermediate spacers 16''', 116''' are typically located between approximately 17% of the diameter of flat proximate surface 12A from the perimeter of flat proximate surface 12A and approximately 17% of the diameter of flat proximate surface 12A from center 12C.

FIG. 5A depicts one possible configuration of spacers 16. As can be seen from FIG. 5A, a plurality (e.g. five or some other suitable number) of outer spacers 16' are spaced apart at equal angular intervals around center 12C of proximate flat surface 12A and are located at or near perimeter of proximate flat surface 12A (e.g. within approximately 17% of the diameter of flat proximate surface 12A from the perimeter of flat surface 12A). Additionally, one central spacer 16" is located at center 12C of proximate flat surface 12A. As such, the arrangement of all six spacers 16 is circularly symmetric about center 12C.

FIG. 5B depicts another possible configuration of spacers 16. As can be seen from FIG. 5B, a plurality (e.g. five or some other suitable number) of intermediate spacers 16''' are spaced apart at equal angular intervals around center 12C of proximate flat surface 12A and are each located away from the perimeter of proximate flat surface 12A (e.g. between approximately 17% of the diameter of flat proximate surface 12A from the perimeter of flat surface 12A and approximately 17% of the diameter of flat proximate surface 12A from center 12C). Additionally, one central spacer 16" is located at center 12C of proximate flat surface 12A. As such, the arrangement of spacers 16 is circularly symmetric.

FIG. 5C depicts another possible configuration of spacers 16. As can be seen from FIG. 5C, a plurality (e.g. five or some other suitable number) of outer spacers 16' are spaced apart at equal angular intervals around center 12C and are each located near the perimeter of proximate flat surface 12A (e.g. within approximately 17% of the diameter of flat proximate surface 12A from the perimeter of flat surface 12A). Additionally, a plurality (e.g. five or some other suitable number) of intermediate spacers 16''' are spaced apart at equal angular intervals about the center of proximate flat surface 12A (e.g. between approximately 17% of the diameter of flat proximate surface 12A from the perimeter of flat surface 12A and approximately 17% of the diameter of flat proximate surface 12A from center 12C). As such, the arrangement of spacers 16 is circularly symmetric.

FIG. 5D depicts a possible configuration of spacers 116. As can be seen from FIG. 5D, a plurality (e.g. four or some other suitable number) of outer spacers 116' are spaced apart at equal angular intervals around the center of proximate flat surface 12A and are each located near the perimeter of proximate flat surface 12A (e.g. within approximately 17% of the diameter of flat proximate surface 12A from the perimeter of flat surface 12A). Additionally, one central spacer 116" is located at center 12C. As such, the arrangement of spacers 116 is circularly symmetric.

Spacers 16 and 116 are interchangeable. One or more of spacers 116 in the FIG. 5D embodiment could be replaced with a spacer 16. In the embodiments depicted in FIGS. 5A-5C and described herein, one or more of spacers 16 could be replaced with a spacer 116. Similarly, spacers having a different perimeter shape entirely could be used in any of the embodiments depicted in FIGS. 5A-5D and described herein. The deformation of optical plate 14 and its proximate surface 14A by pressing against spacers 16 can be modelled using the elastic properties of the glass or other material from which plates 12, 14 and spacers 16 are fabricated.

The components of etalon assembly 20 according to various embodiments (e.g. first optical plate 12, second optical plate 14 and spacers 16) may be made of the same type of glass or other optical material or a variety of types of glass or other optical materials, as long as the various components can be bonded together using optical contact bonding. Examples of suitable glass or other optical materials include fused silica, quartz and borosilicate glass (sometimes referred to as Pyrex™). Relative to prior art etalons, first and second plates 12, 14 may be fabricated from relatively inexpensive materials (e.g. borosilicate glass). Such relatively inexpensive materials may be used, in some embodiments, because of the superior thermal response associated with the combination of the relatively thick first optical plate 12 and the relatively thin second optical plate 14 which may thermally deform together (e.g. in unison).

In currently preferred embodiments, the types of glass or other optical materials used to fabricate the components of etalon 10 have the same or similar thermal expansion coefficients. In particular, in some embodiments, first optical plate 12, second optical plate 14 and spacers 16 may have thermal expansion coefficients within +/−5% of one another. Such coefficients of thermal expansion may help to reduce internal stress in the finished etalon, maintain the bonds between the spacers and the optical plates 12, 14 and/or allow the etalon to be used in applications where the temperature may change. In some embodiments, the type of materials used to fabricate first optical plate 12, second optical plate 14 and/or spacers 16 may have low thermal expansion coefficients. For example, in some embodiments, the these thermal expansion coefficients of the materials used to make any one or more of first optical plate 12, second optical plate 14 and/or spacers 16 may be less than $6 \times 10^{-6}$ m/(m·K). In some embodiments, these thermal expansion coefficients of the materials used to make any one or more of first optical plate 12, second optical plate 14 and/or spacers 16 may be less than $5 \times 10^{-6}$ m/(m·K). When compared to etalons fabricated from a pair of relatively thick optical plates, etalon 10 fabricated from a relatively thin second plate 14 and a relatively thick first plate 12 may be more robust to and may exhibit better optical performance in response to thermal effects (e.g. thermal expansion effects). This characteristic of etalon 10 may be due to the relatively high deformability of thin second optical plate 14 (as compared to relatively thick plates) and the ability of the first and second optical plates to deform relative to one another and in unison with one another.

Proximate flat surface 12A and proximate concave surface 14A may be coated with suitable reflective coatings to increase their reflectivity. However, this is not necessary. In some embodiments, proximate flat surface 12A and proximate concave surface 14A are not coated in the regions where these surfaces are or will be bonded (e.g. optically contact bonded) to spacers 16. For example, a suitable masking process or the like can be used to avoid coating these regions. In some embodiments, proximate flat surface 12A and proximate concave surface 14A need not be coated with reflective coatings.

Aspects of the invention provide methods for manufacturing etalons.

In some embodiments, a first step is to assemble an etalon assembly. The components of etalon assembly may comprise a plurality of components, as described above in relation to etalon assembly 20. The following method may be practiced with any of the etalon assemblies 20 described above or any variation of the etalons comprising a combination of the features described above.

Etalon assembly 20 (or portions thereof) may be used to fabricate a finished etalon 10 (e.g. of the type shown in FIG. 6) according to particular embodiments. In some embodiments, to fabricate an etalon 10 using etalon assembly 20 (or portions thereof), second optical plate 14 may be deformed to flatten proximate concave surface 14A and the assembled etalon components may bonded together to provide a finished etalon 10. In some embodiments, the assembled etalon components are bonded together using optical contact bonding. Optical contact bonding is a glue-less process whereby two closely conformal surfaces are joined together using intermolecular forces (e.g. Van der Waals forces, hydrogen bonds and/or dipole-dipole interactions).

Figure 8:
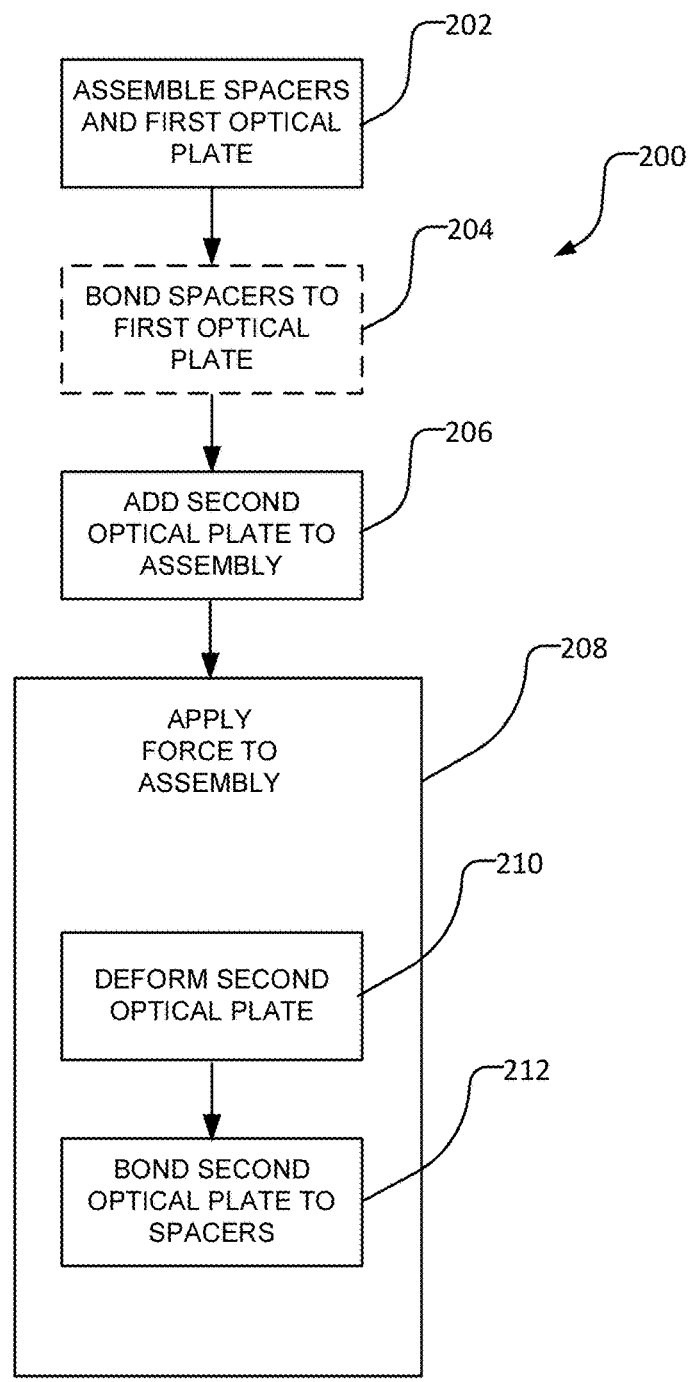
FIG. 8 is a block diagram of a method of manufacturing an etalon according to a particular embodiment.

FIG. 8 schematically depicts a method 200 for fabricating an etalon 10 according to a particular embodiment. Method 10 commences in block 202, where spacers 16 are arranged on proximate flat surface 12A (e.g. in a configuration illustrated in any of FIGS. 5A-5D or in any other suitable configuration), such that their abutment surfaces 16B abut against proximate flat surface 12A. Method 200 then proceeds to optional block 204, where spacers 16 are bonded to proximate flat surface 12A. To facilitate optical contact bonding between abutment surfaces 16B and proximate flat surface 12A, these surfaces may be mutually conformal (e.g. flat and parallel) may be clean and free from any small contamination that could prevent or weaken the optical contact bond. Any grease films, specks or dust may be removed from abutment surfaces 16B which abut against proximate flat surface 12A. To complete the process of forming an optical contact bond between abutment surfaces 16B and proximate flat surface 12A in block 204, the surfaces need only be brought into contact under suitable conditions.

After spacers 16 are optical contact bonded to proximate flat surface 12A, method 200 proceeds to block 206, where second plate 14 is added to the assembly (of spacers 16 and first optical plate 12) with concave surface 14A arranged to face abutment surfaces 16A of spacers 16 and proximate flat surface 12A of first optical plate 12. After adding second plate 14 to the assembly, first and second optical plates 12, 14 may be forced toward one another using external force in block 208 to thereby deform second optical plate 14 and flatten concave surface 14A (depicted notionally in FIG. 8 as block 210) and bond the deformed surface 14A to abutment surfaces 16A of spacers 16A (depicted notionally in FIG. 8 as block 212).

Figure 7A:
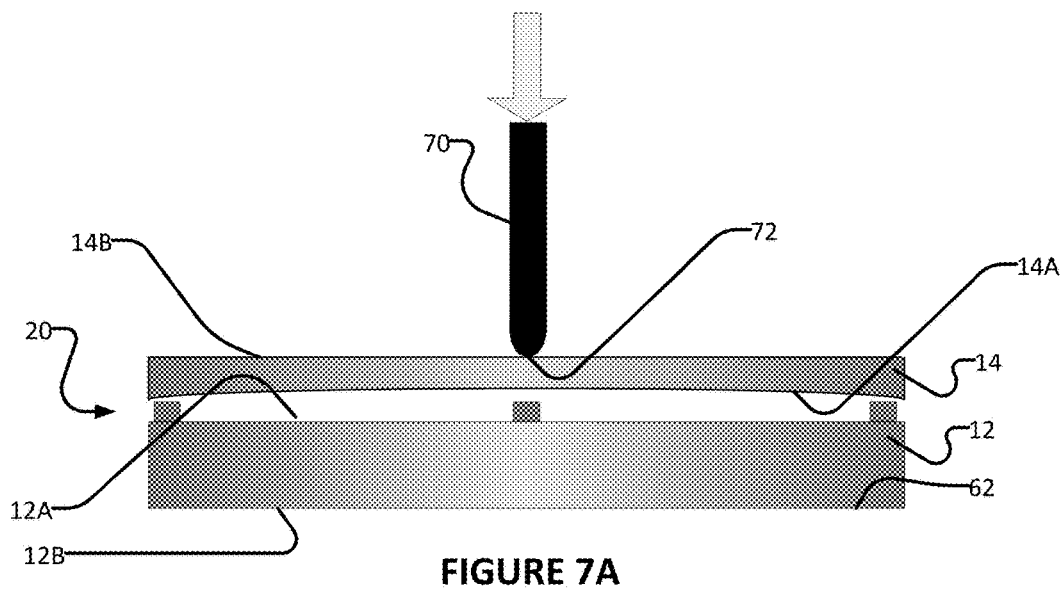
FIGS. 7A and 7B are schematic diagrams of an exemplary method for deforming a second optical plate and bonding a plurality of spacers to the second optical plate according to a particular embodiment.
Figure 7B:
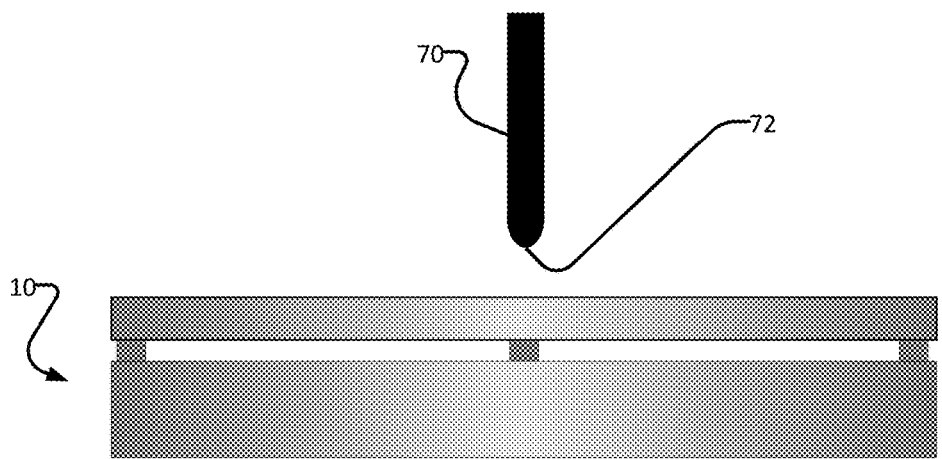

Optical plate 14 may be forced toward optical plate 12 (or optical plates 12, 14 may be forced toward one another) using any of a variety of suitable techniques. FIGS. 7A and 7B schematically depict one technique which may be used to force optical plates 12, 14 toward one another which may be used to implement block 210 according to a particular example embodiment.

In FIG. 7A, force is applied to distal surface 14B of optical plate 14 to force optical plate 14 toward optical plate 12. In some embodiments, such force may be applied, for example, by the finger or other body part of an equipment manufacturing technician. In some embodiments, force may be applied to distal flat surface 14B by a tool 70 to force optical plate 14 toward optical plate 12. Such force may be generated by any suitable technique, including without limitation, human-generated force, pneumatic force, hydraulic force, magnetic force, manual force or the force of gravity.

In the FIG. 7A embodiment, external force is applied at or near center 14C of distal flat surface 14B of second plate 14. In other embodiments, external force may be applied evenly across distal flat surface 14B of second plate 14. In some embodiments, relatively large forces may be applied at one or more locations relatively proximate to center 14C of distal flat surface 14B and relatively small forces may be applied at one or more locations relatively far from center 14C of distal surface 14B. In some embodiments, a circularly symmetric force profile centered at center 14C of distal flat surface 14B may be applied to distal flat surface 14B. In some embodiments, force may be applied at one or more locations on distal flat surface 14B corresponding to the locations of spacers 16. Contact surface 72 of tool 70 and/or the finger or other body part of an equipment manufacturing technician may be coated with a soft material (not shown) to avoid damaging the surfaces of optical plates 12, 14. For example, an equipment manufacturing technician may wear suitable gloves (e.g. latex gloves, rubber gloves or the like), to avoid contaminating or otherwise damaging optical plate 14.

Referring back to FIG. 8, at the conclusion of block 206 (i.e. prior to the application of external force in block 208), proximate concave surface 14A may only contact abutment surfaces 16A of some of the plurality of spacers 16 or even some portions of the abutment surfaces 16A of some of the plurality of spacers 16. For example, in the case of the FIG. 5A embodiment, concave surface 14A may only contact abutment surfaces 16A of outer spacers 16' (or portions thereof) and may not contact central spacer 16" prior to the application of external force in block 208. As external force is applied to force optical plates 12, 14 toward one another in block 208, optical plate 14 deforms (notional block 210) and contacts spacers 16 to form bonds (e.g. optical contact bonds) with spacers 16 (notional block 212). In particular, as part of block 210, optical plate 14 may deform and concave surface 14A may tend to flatten. Due to the small thickness $t_{2a}$ of optical plate 14 relative to the thickness $t_1$ of first optical plate 12, application of external force in the manner described above with reference to FIG. 7A may tend to deform second optical plate 14 prior to any substantial deformation of first optical plate 12 and/or may tend to deform second optical plate 14 by an amount that may be significantly greater than the amount of deformation of first optical plate 12. In particular, application of external force in manner described above with reference to FIG. 7A may tend to deform second optical plate 14 such that concave surface 14A tends to flatten and to provide a flat planar deformed surface which may be parallel to proximate flat surface 12A.In addition, because of the interposed spacers, the proximate surfaces of the first and second plates may deform together—e.g. in unison. First optical plate 12 and second optical plate 14 remain spaced apart by a distance equal to the thickness $t_s$ of spacers 16.

Figure 6:
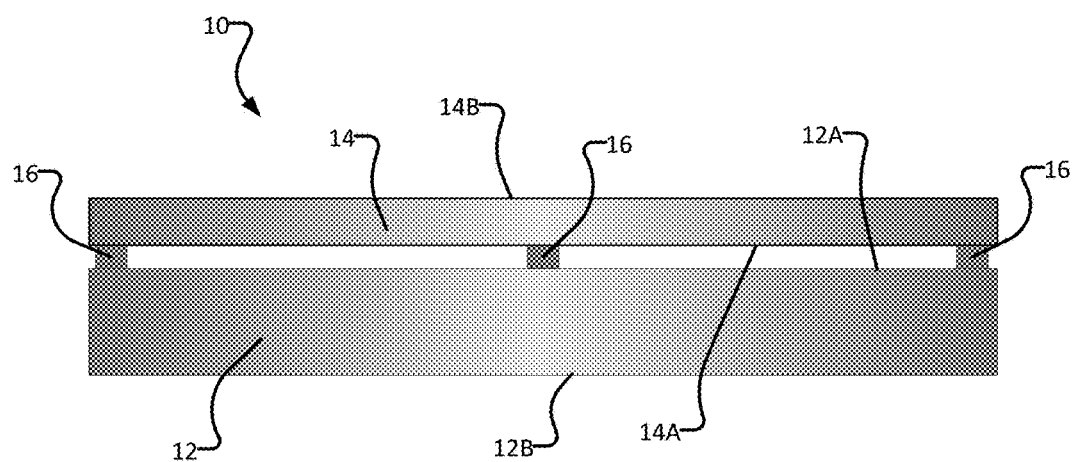
FIG. 6 is a cross-section of an etalon fabricated using the FIG. 1 etalon assembly according to a particular embodiment.

Notional block 212 involves bonding (now flattened) proximate surface 14A of second optical plate 14 to abutment surfaces 16A of spacers 16. Once force is applied to second optical plate 14 (as described above) in block 208, proximate surface 14A deforms (notional block 210) and sufficient contact will occur between proximate surface 14A and the abutment surface 16A of each of spacers 16, thereby allowing an optical contact bond to form between proximate surface 14A and abutment surfaces 16A of spacers 16 (notional block 212). To facilitate optical contact bonding between abutment surfaces 16A and proximate concave surface 14A, these surfaces may be mutually conformal (e.g. flat and parallel) may be clean and free from any small contamination that could prevent or weaken the optical contact bond. Any grease films, specks or dust may be removed from abutment surfaces 16A which abut against proximate concave surface 14A. To complete the process of forming an optical contact bond between abutment surfaces 16A and proximate concave surface 14A in block 204, the surfaces need only be brought into contact under suitable conditions. The optical contact bonds between each of spacers 16 and proximate surface 14A may be sufficient to secure optical plate 14 in place relative to optical plate 12 and spacers 16 and may maintain the deformation of concave surface 14A to provide a monolithic etalon 10 (FIG. 6). In some embodiments (e.g. where block 204 is not used), optical contact bonds between proximate flat surface 12A of first optical plate 12 and abutment surfaces 16B of spacers 16 may be additionally or alternatively implemented in block 212. Referring back to FIGS. 7A and 7B, after application of force in block 208, tool 70 (and/or the finger or other body part of an equipment manufacturing technician) may be removed from contact with etalon 10. The bonds between spacers 16 and surfaces 12A, 14A may be complete, resulting in a monolithic etalon 10 (FIG. 7B).

In the illustrated embodiment, external force is applied to second optical plate 14 (in block 208) to force the relatively thin second optical plate 14 toward the relatively thick first optical plate 12. Additionally or alternatively, external forces may be used to force optical plate 14 toward optical plate 12, optical plate 12 toward optical plate 14 and/or optical plates 12, 14 toward one another (e.g. in block 210) using any of a variety of techniques. Such force may be generated by any suitable technique, including without limitation, human-generated force, pneumatic force, hydraulic force, magnetic force, manual force or the force of gravity. As discussed above in relation to FIG. 7A, force having any of the profiles discussed above may be applied to optical plate 14 and/or optical plate 12.

In some embodiments, distal surface 12B and/or distal surface 14B may be grinded and/or polished (e.g. after block 208) to finish the etalon, although this is not necessary. Such grinding and polishing may comprise multiple iterations and testing to achieve the desired shape, although this is not necessary.

The finished etalon 10 has a structure similar to etalon assembly 20, except that the etalon is monolithic and concave surface 14A is flat and in contact with all spacers 16. The resulting etalon 10 may share many other properties of etalon assembly 20. The resulting etalon 10 may comprise a plurality of spacers 16 having the same thickness. Spacers 16 may have a circularly symmetric arrangement—e.g. there may be equal angular spacing between circumferentially adjacent pairs of spacers 16.

It is significantly easier, faster and less costly to make a surface with a slightly concave shape as compared to a high accuracy (or low surface figure) flat surface, as is used in traditional etalons. This is particularly the case, where the surface figure of the concave surface is permitted to be greater than those of the corresponding flat surfaces. However, traditionally, neither concave surfaces nor low accuracy (or high surface figure) flat surfaces have been usable for manufacturing etalons. In addition to the cost savings associated with fabricating optical surfaces which are permitted to have relatively large surface figure, the techniques associated with particular embodiments described herein permit the use of second optical plates which are relatively thin and thereby provide considerable savings of material costs. Further, the combination of a relatively thick plate (optical plate 12) and a relatively thin plate (optical plate 14) in etalon 10 may be able to accommodate relatively high temperature variation with minimal deviation from the parallelism of proximate surfaces 12A, 14A, since the thin plate can more readily deform further to accommodate heat-induced changes (or other changes) to the shape of surface 12A.

The term "parallel" as used herein to describe a relationship between two planar surfaces, describes two planar surfaces which have parallel normal vectors. In some embodiments, the parallelism of the surfaces and/or their normal vectors need not be perfect over the entirety of a planar surface in a mathematical sense and small deviations from the parallelism of the normal vectors are permissible (in accordance with manufacturing tolerances) provided that the functionality described herein is achieved or achievable.

While a number of exemplary aspects and embodiments are discussed herein, those of skill in the art will recognize certain modifications, permutations, additions, and sub-combinations thereof. For example:

- Although only a few embodiments are depicted in the drawings, an etalon assembly can include any combination of number and pattern of spacers and method for deforming the first optical plate.
- Although the above method is described for creating an etalon from two glass plates, one having a concave surface, a similar method could be used for forming an etalon from two glass plates, one having a convex surface.
- Although, in embodiments of etalon assembly 20 herein, both of distal flat surface 12B and distal flat surface 14B are depicted as being parallel to proximate flat surface 12A, in some embodiments, either or both of distal flat surface 12B and distal flat surface 14B are non-parallel to proximate flat surface 12A. In some embodiments of etalon assembly 20, distal flat surface 12B and distal flat surface 14B are parallel to each other and non-parallel to proximate flat surface 12A.
- This application refers to illuminating an etalon with a diffuse coherent or non-coherent light source. This type of light is suitable for most usage of an etalon, but this type of light is not necessary. With light having more than one wavelength, each wavelength may generate its own set of fringes. The resolving power of an etalon may be used to refer to the ability to discern the etalon-generated fringes of one wavelength from the etalon-generated fringes of another wavelength.

This application refers to illuminating an etalon using light. In general, it is not necessary that such light be human-visible light and in general, usage of the word light herein should be understood to include electromagnetic waves of any suitable wavelength and/or frequency, except when the context expressly dictates otherwise.

What is claimed is:

1. A method for manufacturing an etalon, the method comprising:
   optical contact bonding a plurality of spacers to a flat surface of a first optical plate; and
   optical contact bonding a second surface of a second optical plate to the plurality of spacers;
   wherein optical contact bonding the second surface of the second plate to the plurality of spacers comprises deforming the second surface until the second surface contacts the plurality of spacers to form optical contact bonds therewith, wherein deforming the second surface comprises deforming the second surface from a concave shape to a generally flat shape.

2. A method according to claim 1 wherein the generally flat shape of the second surface is parallel to the flat surface of the first optical plate.

3. A method according to claim 1 wherein the first optical plate has a thickness that is greater than a thickness of the second optical plate.

4. A method according to claim 1 wherein deforming the second surface comprises applying a force to the second optical plate, the force directed toward the first optical plate.

5. A method according to claim 4 wherein applying the force to the second optical plate comprises applying a human-generated force to the second optical plate.

6. A method according to claim 1 wherein a maximum depth of the concavity is in a range of 50 nm-350 nm.

7. A method according to claim 1 wherein at least one of the first optical plate, the second optical plate and the plurality of spacers comprises borosilicate glass.

8. A method according to claim 1 wherein at least one of the first optical plate, the second optical plate and the plurality of spacers comprises fused silica.

9. A method according to claim 1 comprising arranging the plurality of spacers in a circularly symmetric pattern about an axis of symmetry.

10. A method for manufacturing an etalon, the method comprising:
    arranging a plurality of spacers between a flat surface of a first optical plate and a concave surface of a second optical plate;
    bonding the flat surface of the first optical plate to each of the plurality of spacers;
    deforming the concave surface to provide a deformed surface; and
    bonding the deformed surface of the second optical plate to each of the plurality of spacers, wherein deforming the concave surface comprises deforming the concave surface from a concave shape to a generally flat shape.

11. A method for manufacturing an optical device according to claim 10, wherein bonding the flat surface of the first optical plate and the concave surface of the second optical plate to the each of the plurality of spacers comprises optical contact bonding.

12. A method for manufacturing an optical device according to claim 10, wherein a thickness of the first optical plate is greater than a thickness of the second optical plate.

13. A method for manufacturing an optical device according to claim 10, wherein a maximum depth of the concavity is in a range of 50 nm-350 nm.

14. A method for manufacturing an optical device according to claim 10, wherein the flat surface and the deformed surface are planar and parallel to one another.

15. A method for manufacturing an optical device according to claim 10, wherein deforming the concave surface comprises forcing the second optical plate toward the first optical plate.

16. A method according to claim 10 wherein deforming the concave surface comprises causing the deformed surface to contact the plurality of optical spacers thereby facilitating optical contact bonding.

17. A method for manufacturing an optical device according to claim 15, wherein forcing the first optical plate toward the second optical plate comprises application of human-generated force to the first optical plate.

18. A method for manufacturing an optical device according to claim 10, wherein each of the plurality of spacers comprises a first abutment surface and a second abutment surface and wherein the first abutment surface faces a direction opposing that of the second abutment surface.

19. A method for manufacturing an optical device according to claim 18, wherein the first and second abutment surfaces are planar and parallel to one another.

20. A method for manufacturing an optical device according to claim 10, wherein arranging the plurality of spacers between the flat surface of the first optical plate and the concave surface of the second optical plate comprises: for each of a first subset of the plurality of spacers, abutting a portion of a second abutment surface of the spacer against the concave surface; and, for each of a second subset of the plurality of spacers, providing a space between a second abutment surface of the spacer and the concave surface.

21. A method according to claim 20 wherein deforming the concave surface comprises: for each of the first subset of the plurality of spacers, abutting an entirety of the second abutment surface of the spacer against the deformed surface; and, for each of the second subset of the plurality of spacers, abutting an entirety of the second abutment surface of the spacer against the deformed surface.

22. A method for manufacturing an optical device according to claim 10, wherein at least one of the first optical plate, the second optical plate and the plurality of spacers comprises borosilicate glass.

23. A method for manufacturing an optical device according to claim 10, wherein at least one of the first optical plate, the second optical plate and the plurality of spacers comprises fused silica.

24. A method for manufacturing an optical device according to claim 10, wherein the plurality of spacers are arranged in a circularly symmetric pattern about an axis of symmetry.

25. An etalon comprising:
   a first optical plate having a first flat surface;
   a second optical plate having a second flat surface spaced apart from the first flat surface and facing the first flat surface; and
   a plurality of spacers located between the first and second flat surfaces, each of the plurality of spacers comprising a first abutment surface bonded to the first flat surface and a second abutment surface bonded to the second flat surface;

wherein the second flat surface comprises an elastically deformed surface, the deformed surface having a concave shape prior to deformation, wherein deforming the deformed surface comprises deforming the deformed surface from a concave shape to a generally flat shape.

26. An etalon according to claim 25 wherein, for each spacer, the first abutment surface is optical contact bonded to the first flat surface and the second abutment surface is optical contact bonded to the second flat surface.

27. An etalon according to claim 25 wherein the first optical plate is thicker than the second optical plate.

28. An etalon according to claim 25 wherein the first and second flat surfaces are planar and parallel to one another.

* * * * *